July 1, 1930. C. G. KELLER 1,768,959
BRAKE DRUM
Original Filed April 26, 1927 2 Sheets-Sheet 1
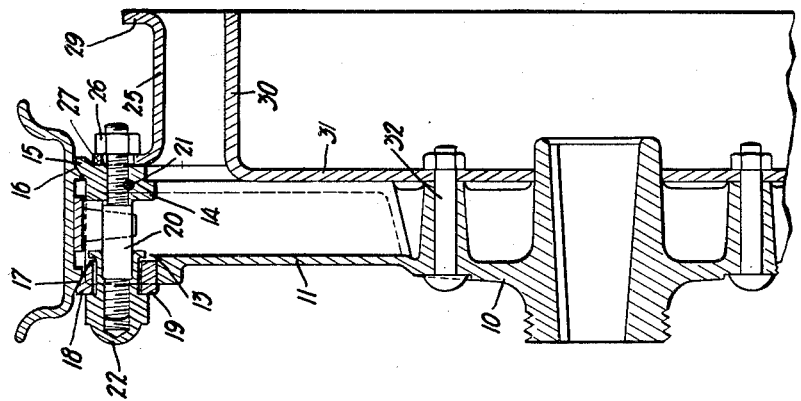
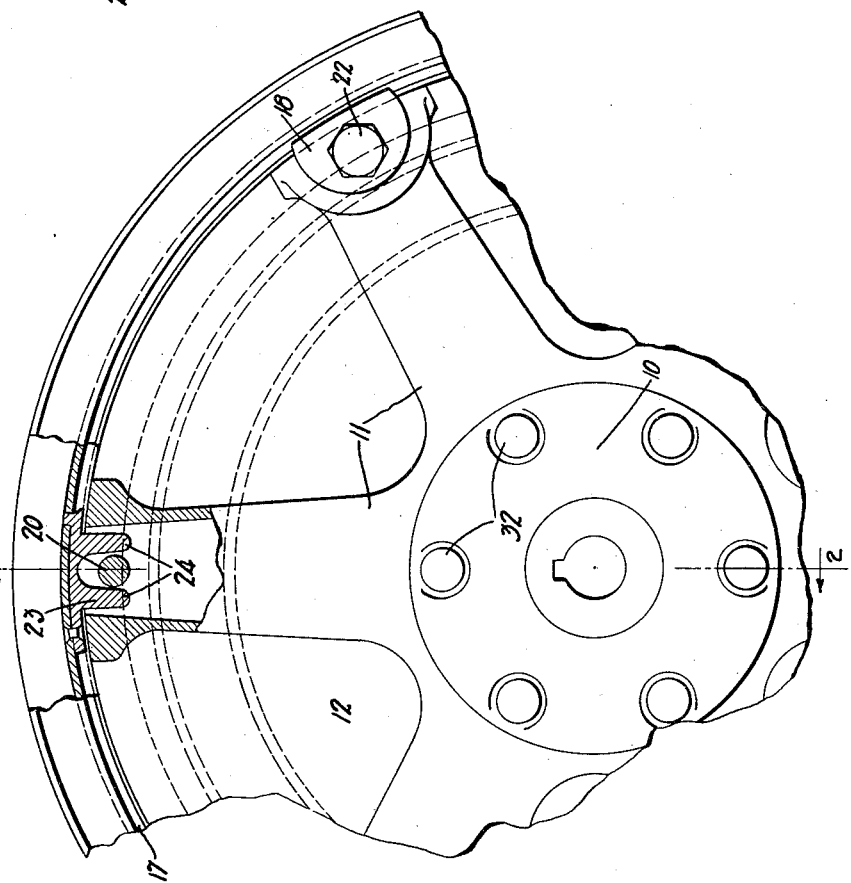
INVENTOR
*Charles G. Keller.*
BY
ATTORNEYS July 1, 1930.    C. G. KELLER    1,768,959
BRAKE DRUM
Original Filed April 26, 1927    2 Sheets-Sheet 2
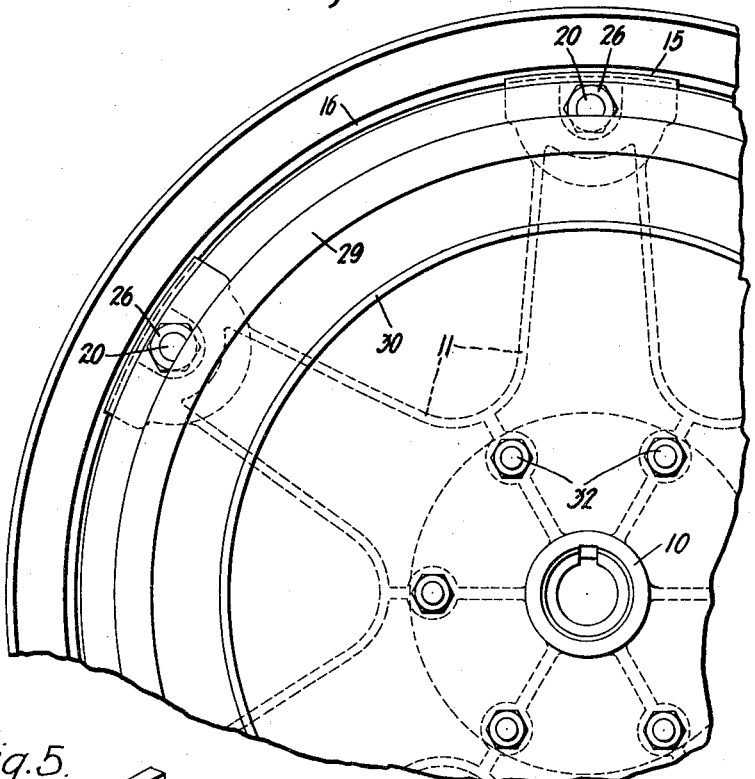
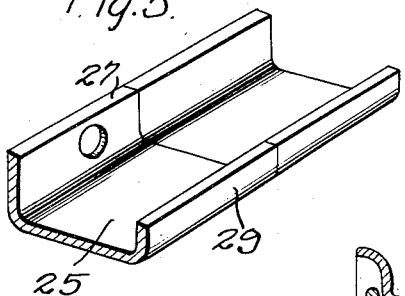
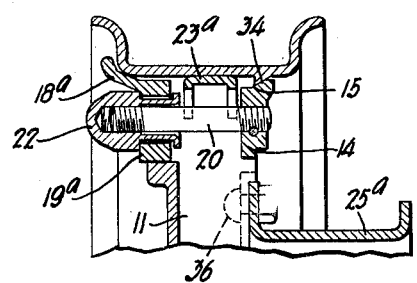
INVENTOR
*Charles G. Keller.*
BY
*Dean Fairbank Albright & Hirsch*
ATTORNEYS Patented July 1, 1930

1,768,959

UNITED STATES PATENT OFFICE

CHARLES G. KELLER, OF POUGHKEEPSIE, NEW YORK

BRAKE DRUM

Original application filed April 26, 1927, Serial No. 186,628. Divided and this application filed December 14, 1927. Serial No. 239,879.

This application is a division of my prior and copending application, Serial No. 186,628, filed April 26th, 1927.

One object of the invention is to provide a brake drum formed of a strip of sheet metal bent to circular form with the ends butt-welded, at least one edge flanged for reinforcement and attachment to the wheel. Among the advantages of such a brake drum are reduced cost of manufacture and less weight for a given strength.

In the accompanying drawing I have illustrated certain embodiments of my invention, but these are to be considered in an illustrative rather than in a limiting sense.

Fig. 1 is an end view of a portion of a wheel embodying one form of my invention, part of the structure being broken away, Fig. 2 is a section on the line 2—2 of Fig. 1.
Fig. 3 is a view similar to Fig. 1, but of the other side of the wheel, Fig. 4 is a view similar to a part of Fig. 2, but showing different details of construction, and Fig. 5 is a perspective view of a portion of the brake drum showing the butt-welded ends.

The wheel shown in Figs. 1, 2 and 3 is of the fellyless form, including a hub 10 and a plurality of spokes 11 which may be formed as a single integral casting. The spokes 11 are preferably of U-shape in cross-section and may be connected by a web 12, so that the form rubs on the outer side and grooves on the inner side of a disk. The outer edge of the web may be at any distance from the center, and in some constructions the web may be omitted if desired. The wheel body casting is so designed that it may be made by the use of a two part green sand mold without the use of any cores and the casting may be machined to the final form by only a few simple operations.

For securing the tire rim to the spoke ends the outer end or head of each spoke is provided with a recess 13 approximately semi-cylindrical in form with the axis of the cylindrical surface paralleling the axis of the wheel. At the hub cap side, that is, the front side of the wheel, the recess is open, but at the opposite or rear side it is closed by an end wall or bridge piece 14. The outer or peripheral surface of the wall is curved concentrically with the wheel and has a portion 15 which is also axially inclined from a smaller diameter toward the front side of the wheel to a larger diameter toward the rear side of the wheel.

My improved wheel is adapted to carry a removable rim having an inclined surface or shoulder portion 16 which may be on an annular head near the inner edge of the rim and adapted to coact with the inclined peripheral surfaces 15 of the end walls 14 on the several spokes. The rim is also provided with an inclined surface or shoulder portion 17 which may be on a bead near the outer edge of the rim. For engaging this, I provide a lug, slide or collar 18 having a substantially semi-cylindrical surface adapted to fit the semi-cylindrical recess 13, and an arcuate surface 19 axially inclined in a direction which is the reverse of the taper or inclination of the surface 15 of the end wall 14. The engaging surfaces of the recesses 13 and the lugs or collars 18 may extend through a little over 180° so that the lugs cannot move radially out of the recesses and are guided in and out axially. It should be understood that the end wall 14 may be constructed so that the inclined surface 15 thereof will engage the inner edge of the rim itself, and that the internal bead near the outer edge of the rim may be rendered unnecessary by a suitable change in the shape of the lugs 18.

By forcing or drawing the lugs 18 toward the inner walls 14, the rim will be tightly wedged or clamped in place on the spokes. For this purpose one end of a bolt 20 is rigidly secured to the wall 14 at the rear of each recess 13. It may be locked in said wall threading and if necessary by suitable means such as a pin 21 forced through an opening in said wall 14 and engaging the side of the bolt. Each lug or collar 18 has an aperture to receive the outer end of the corresponding bolt 20 and is forced into place to clamp the rim by means of a nut 22 threaded on the front ends of said bolts.

It is advantageous to reduce the number of separate parts to be kept track of during changes of rims and tires. To this end the nut 22 is swivelled in each lug or collar 18 by means of a sleeve extending through the lug or collar and turned back as by spinning to prevent separation of the two parts.

In order to prevent creeping of the tire on the rim use may be made of the device which is used to fasten together the two ends of the rim. As shown in Fig. 1, the fastening member 23 is riveted to one end of the rim and is provided with a lug to enter a recess in the other end of the rim to hold the two ends together. This member is provided with two substantially radially extended lugs 24 of sufficient length to include therebetween the bolt 20 at the end of the corresponding spoke. It will be seen that these lugs might also act to prevent creeping by engagement with the sides of the spoke even if the lugs were not of sufficient length or spacing to cooperate with the bolt. The lugs 24 are short enough so as to pass into or out of the recess 13 at the end of the corresponding spoke.

The rear end of the bolts 20 may project from the spokes and may be used for securing a brake drum 25 to the wheel. The brake drum 25 is provided at suitable positions with apertures to receive the rear ends of the bolts 20 so that the brake drum may be clamped by nuts 26. An important feature of the present invention resides in the brake drum 25 and the manner of making the same. This brake drum is formed by taking strip or sheet metal of proper width and forming it into annular shape with suitable flanges at one or both edges, the ends of the strip then being butt-welded to complete the brake drum. The flange 27 at the inner side is provided with openings to receive the rear ends of the bolts 20 and to enable the brake drum 25 to be secured in position by the nuts 26. A flange 29 may be provided at the other edge of the drum to reinforce the latter. The wheel may be provided with a brake drum 30 having at one edge a web 31 provided at its center with an opening to receive the inner end of the hub and fit thereon. The web 31 is bolted to the hub 10 by bolts 32. Either one of these brake drums may be omitted, or in some cases, both may be used for two separate sets of brake bands or shoes.

In Fig. 4 there is shown a different form of rim which may be of a standard form and has but a single internal rib having an inclined inner surface 34 tapering from a smaller diameter to a larger one toward the inside of the wheel, and adapted to engage the inclined surface 15 on the wall 14. The tire is fastened on the wheel by means of a bolt 20 and a nut 22 such as described with reference to Fig. 2 and a lug or collar 18ª which corresponds in general with collar or lug 18, but instead of engaging a bead at the interior of the tire as shown in Fig. 2, is extended so as to engage the rim at the outer side thereof. In this form creeping of the rim may be prevented by a device 23ª which may be similar in general to the corresponding device 23 shown in Figs. 1 and 2 and may be formed of sheet metal and secured in position on the rim in any suitable manner as by spot welding. The brake drum 25ª is made the same as the brake drum 25 shown in Fig. 2, but is secured by bolts 36 to the web between successive spokes. The edge of the web may be spaced some distance from the rim and may present an edge lip to hold the drum concentric with the wheel.

Having thus described my invention, what I claim as new and desire to secure by Letters Patent is:—

1. A brake drum formed of a strip of sheet metal with its ends butt-welded together and bent at one edge to provide an attaching flange.

2. A brake drum comprising a strip of sheet metal offset at one edge to form a flange, and having its ends butt-welded together.

3. A brake drum comprising a single strip of sheet metal having its ends butt-welded together and being offset at one edge for attachment to a wheel, and at the other edge to provide a stiffening flange.

Signed at Newark, in the county of Essex and State of New Jersey, this 12th day of December, A. D. 1927.

CHARLES G. KELLER.